US012637200B2

(12) United States Patent
Grocott et al.

(10) Patent No.: US 12,637,200 B2
(45) Date of Patent: May 26, 2026

(54) PANELS FOR USE IN A GALLEY OF AN AIRCRAFT

(71) Applicant: B/E Aerospace (UK) Limited, Leighton Buzzard (GB)

(72) Inventors: Edward John Reynard Grocott, Hitchin (GB); Craig T. Ohl, Maize, KS (US); Shahzaib Hussain Qurashi, Luton (GB); Rafael Blumberg, Milton Keynes (GB)

(73) Assignee: B/E AEROSPACE (UK) LIMITED, Leighton Buzzard (GB)

( * ) Notice: Subject to any disclaimer, the term of this patent is extended or adjusted under 35 U.S.C. 154(b) by 0 days.

(21) Appl. No.: 18/807,132

(22) Filed: Aug. 16, 2024

(65) Prior Publication Data

US 2025/0066010 A1 Feb. 27, 2025

(30) Foreign Application Priority Data

Aug. 21, 2023 (EP) .................................... 23192486

(51) Int. Cl.
| | |
|---|---|
| *B64C 1/40* | (2006.01) |
| *B64C 1/06* | (2006.01) |
| *B64D 11/04* | (2006.01) |

(52) U.S. Cl.
CPC ................ *B64C 1/40* (2013.01); *B64C 1/066* (2013.01); *B64D 11/04* (2013.01)

(58) Field of Classification Search
CPC .......... B64C 1/40; B64C 1/066; B64D 11/04; B32B 3/266
See application file for complete search history.

(56) References Cited

U.S. PATENT DOCUMENTS

| | | | | |
|---|---|---|---|---|
| 11,214,373 | B2 * | 1/2022 | Schalla ................. | B64D 13/08 |
| 11,293,827 | B1 | 4/2022 | Neti et al. | |
| 11,492,120 | B2 * | 11/2022 | Burd ..................... | B64D 11/04 |

FOREIGN PATENT DOCUMENTS

| | | |
|---|---|---|
| DE | 29804099 | 4/1998 |
| DE | 102020002099 | 10/2021 |
| EP | 0074092 | 4/1987 |

OTHER PUBLICATIONS

European Patent Office; European Search Report dated Dec. 22, 2023 in Application No. 23192486.1.

* cited by examiner

*Primary Examiner* — Valentina Xavier
(74) *Attorney, Agent, or Firm* — SNELL & WILMER L.L.P.

(57) ABSTRACT

A panel for use in the construction of a galley of an aircraft is disclosed. The panel comprises a décor panel and at least one insulation panel. The décor panel has first and second opposing faces, and a housing aperture extends through the décor panel between the first and second faces. The housing aperture is of substantially the same configuration as the insulation panel or the insulation panels collectively when arranged side by side or when stacked. The housing aperture is configured to receive the at least one insulation panel, and the or each insulation panel is located in the housing aperture.

20 Claims, 5 Drawing Sheets

PANELS FOR USE IN A GALLEY OF AN AIRCRAFT

CROSS-REFERENCE TO RELATED APPLICATIONS

This application claims priority to and the benefit of EP Patent Application No. 23192486.1 filed Aug. 21, 2023 and titled "PANELS," which is incorporated by reference herein in its entirety for all purposes.

FIELD

This disclosure relates to panels, and in particular, panels suitable for use in the construction of a galley on an aircraft.

BACKGROUND

Some aircraft, for example commercial passenger aircraft typically include one or more galleys for use in storing and preparing food and beverages on the aircraft. The food and beverages are typically stored in galley carts. At least some of those carts are stored in cooled or refrigerated cart compartments in the galley.

The or each galley is typically separated from the rest of the aircraft by one or more walls. Each wall is typically formed from one or more panels. The or each panel is typically designed to be lightweight and robust. Typically the panels include or are connected to multiple metal structural members. The multiple metal members typically form thermal bridges between the faces of the panels/wall constructed from the panels.

The cooled or refrigerated compartments are typically at least partially defined by a panel or part of a panel. That panel or part of a panel may also be part of a wall that at least partially defines the galley. As a result, the thermal efficiency of the cooled or refrigerated compartments is at least partially dependent on the insulative properties of the or each panel. It is known that the less insulated and thus thermally efficient the cooled or refrigerated compartments are, the greater the amount of cooling of those compartments will be required. The greater the amount of cooling required, the larger, and thus heavier and more energy consumptive, the cooling apparatus has to be to achieve the desired level of cooling. This leads to greater fuel use and thus greater running costs for the aircraft compared to smaller and less energy consumptive cooling apparatus.

SUMMARY

According to a first aspect of the present disclosure there is provided a panel for use in the construction of a galley of an aircraft. The panel comprises a décor panel and at least one insulation panel. The décor panel has first and second opposing faces and a housing aperture extends through the décor panel between the first and second faces. The housing aperture is of substantially the same configuration as the insulation panel or the collective insulation panels when arranged side by side or when stacked, the housing aperture is configured to receive the at least one insulation panels, and the or each insulation panel is located in the housing aperture.

A panel of the first aspect may also or in the alternative be used for the construction of at least part of a cooled or refrigerated cart compartment in the galley.

A panel is to be understood to have first and second opposed faces with the body of the panel being located between those faces. Dimensionally the distance between the first and second faces is significantly smaller than the dimensions of the faces in directions along the surfaces of the faces.

The perimeter of a panel is to be understood as the path of the edge of one or both of the first and second faces of the panel.

In an embodiment of the above embodiment, the housing aperture is of substantially the same configuration as the insulation panel. The configuration of the insulation panel is the shape of the perimeter of the insulation panel and the dimensions of the perimeter of the insulation panel.

In an embodiment of the above embodiment, the housing aperture is of substantially the same configuration as the collective configuration of the insulation panels when arranged side by side. That is when the insulation panels are all in the same plane.

In an embodiment of any of the above embodiments, the housing aperture is of substantially the same collective configuration as the insulation panels when stacked. That is the first face of one insulation panel overlies the second face of an adjacent insulation panel.

In an embodiment of the above embodiment, the first and second opposed faces of one or more of the panels are parallel or substantially or approximately parallel with each other.

In an embodiment of any of the above embodiments, the insulation panel or the insulation panels collectively when arranged side by side or when stacked is/are a loose fit within the housing aperture. A loose fit may be such that the difference in dimensions of the insulation panel or the insulation panels collectively when arranged side by side or when stacked and the dimensions of the housing aperture is more than 0.0 mm and less than 10 mm, less than 8 mm, less than 6 mm, less than 4 mm or less than 2 mm.

In an embodiment of any of the above embodiments, the décor panel is configured to be lightweight. In some embodiments the décor panel is constructed from first and second sheet elements separated by a honeycomb core such that one face of the first sheet element forms the first face of the décor panel and one face of the second sheet element forms the second face of the décor panel.

In an embodiment of any of the above embodiments, the or each insulation panel is a vacuum insulation panel (VIP).

An advantage of the panel of the present disclosure is that the or each insulation panel may be located on the panel in the position where it will be required, and not in a position where no insulation is necessary. This minimizes the amount of insulation panel required and as a result minimizes the cost and weight associated with the insulation panel.

In an embodiment of any of the above embodiments, the or each vacuum insulation panel is a microporous vacuum insulation panel made from fumed silica. An example of such a vacuum insulation panel is a va-Q-pro panel (trade mark) available from va-Q-tec AG of Würzburg, Germany.

In an embodiment of any of the above embodiments, when there is one insulation panel, the insulation panel has first and second opposing faces, the first and second faces of the insulation panel are spaced from each other by a distance x, the first and second faces of the décor panel are spaced from each other by a distance y, the distances x and y extend in approximately parallel directions, and distance x is less than distance y or distance x is equal to distance y.

In an embodiment of any of the above embodiments, when there is are more than one insulation panel located side by side, the insulation panel has first and second opposing faces, the first and second faces of each insulation panel are spaced from each other by a distance x, the first and second faces of the décor panel are spaced from each other by a distance y, the distances x and y extend in approximately parallel directions, and distance x is less than distance y or distance x is equal to distance y.

In some embodiments the distances x of two or more of the insulation panels are different and the largest of the distances x is less than distance y or the largest of the distances x is equal to distance y.

In an embodiment of any of the above embodiments, when there is more than one insulation panel, the insulation panel has first and second opposing faces, the first and second faces of each insulation panel are spaced from each other by a distance x, the first and second faces of the décor panel are spaced from each other by a distance y, the distances x and y extend in approximately parallel directions, and the sum of the distances x is less than distance y or the sum of the distances x is equal to distance y.

In an embodiment of any of the above embodiments, the panel comprises a cover panel, the cover panel has first and second opposed faces, and the cover panel is fixed to the décor panel with at least part of the second face of the cover panel adjacent to the first face of the décor panel.

When the cover panel is fixed to the décor panel with at least part of the second face of the cover panel adjacent to the first face of the décor panel, the second face of the cover panel is, in some embodiments, in contact with the first face of the décor panel. In other embodiments the second face of the cover panel is spaced from the first face of the décor panel. Such spacing is typically of a relatively small dimension and is as a result of the dimensions of the fixing means that fix the cover panel to the décor panel.

In an embodiment of any of the above embodiments, the cover panel is permanently fixed to the décor panel.

In an embodiment of any of the above embodiments, the cover panel is permanently fixed to the décor panel using an adhesive.

In an embodiment of any of the above embodiments, the cover panel is temporarily fixed to the décor panel.

In an embodiment of the above embodiment when the cover panel is temporarily fixed to the décor panel, the fixation between the cover panel and the décor panel is achieved using one or more of a releasable adhesive, a double-sided adhesive tape, and a burr fastener.

In an embodiment of any of the above embodiments, at least one insulation panel is fixed to the cover panel with the first face of at least one insulation panel adjacent to the second face of the cover panel.

When the insulation panel is fixed to the cover panel with the first face of the insulation panel adjacent to the second face of the cover panel, the first face of the insulation panel is, in some embodiments, in contact with the second face of the cover panel. In other embodiments the first face of the insulation panel is spaced from the second face of the cover panel. Such spacing is typically of a relatively small dimension and is as a result of the dimensions of the fixing means that fix the insulation panel to the cover panel.

In an embodiment of any of the above embodiments, the insulation panel is fixed to the cover panel using one or more of a releasable adhesive, a double-sided adhesive tape, and a burr fastener.

In an embodiment of any of the above embodiments, the distance from the second face of the cover panel to the second face of the or each insulation panel is less than the distance of the second face of the cover panel to the second face of the décor panel.

An advantage of such an embodiment is that the or each insulation panel is protected from damage to its first face by the cover panel, and the second face of the or each insulation panel is recessed in the housing aperture with the result that the second face of the insulation panel is at least partially protected from impact or abrasion by the décor panel.

An advantage of such an embodiment is that the or each insulation panel is protected from damage to its first face by the cover panel, and the second face of the or each insulation panel is recessed in the housing aperture with the result that the second face of the insulation panel is at least partially protected from impact or abrasion by the décor panel.

In an embodiment of any of the above embodiments, the cover panel is formed from a glass reinforced polymer.

In an embodiment of any of the above embodiments, the panel comprises a structural panel having a first and a second face, in which the structural panel is releasably fixed to the décor panel with the second face of the décor panel adjacent to the first face of the structural panel.

When the décor panel is fixed to the structural panel with the second face of the décor panel adjacent to the first face of the structural panel, the second face of the décor panel is, in some embodiments, in contact with the first face of the structural panel. In other embodiments the second face of the décor panel is spaced from the first face of the structural panel. Such spacing is typically of a relatively small dimension and is as a result of the dimensions of the fixing means that fix the décor panel to the structural panel.

In an embodiment of any of the above embodiments, at least one insulation panel is fixed to the structural panel with the second face of the at least one insulation panel adjacent to the first face of the structural panel.

When the insulation panel is fixed to the structural panel with the second face of the insulation panel adjacent to the first face of the structural panel, the second face of the insulation panel is, in some embodiments, in contact with the first face of the structural panel. In other embodiments the second face of the insulation panel is spaced from the first face of the structural panel. Such spacing is typically of a relatively small dimension and is as a result of the dimensions of the fixing means that fix the insulation panel to the structural panel.

In an embodiment of any of the above embodiments, at least one insulation panel is fixed to the structural panel by at least one fixing means, and at least one fixing means is a releasable adhesive, a double-sided adhesive tape, or a burr fastener.

In an embodiment of any of the above embodiments, the distance from the first face of the structural panel to the first face of the or each insulation panel is less than the distance of the first face of the structural panel to the first face of the décor panel.

In an embodiment of any of the above embodiments, the décor panel is releasably fixed to the structural panel using at least one mechanical fixing means.

In an embodiment of any of the above embodiments, the or each mechanical fixing means is configured to be operable from the second face of the structural panel.

In an embodiment of any of the above embodiments, the décor panel comprises a non-zero number of elements of a mechanical fixing system.

In an embodiment of the above embodiment, the or each element of the mechanical fixing system in the décor panel is one of a male or female part of a male-female fixing system.

In an embodiment of any of the above embodiments, at least one element of the mechanical fixing system in the décor panel includes a threaded aperture. In such an embodiment a threaded screw or bolt is used to fix the structural panel to the décor panel.

In an embodiment of any of the above embodiments, at least one element of the mechanical fixing system in the décor panel is the female part of a quarter or half turn fixing system. In such an embodiment a male part of the quarter or half turn fixing system is used to fix the structural panel to the décor panel.

In an embodiment of any of the above embodiments, the structural panel is configured to be lightweight. In some embodiments the structural panel is constructed from first and second sheet elements separated by a honeycomb core such that one face of the first sheet element forms the first face of the structural panel and one face of the second sheet element forms the second face of the structural panel.

In an embodiment of any of the above embodiments, when the panel is for use in the construction of the galley, the panel is so configured that, in use, the second face of the structural panel faces toward the galley, and the first face of the cover panel faces away from the galley. In this embodiment, the first face of the cover panel faces away from the galley and thus towards the rest of the cabin within the aircraft. As a result, the first face of the cover panel is seen by any passengers within the cabin. This is advantageous because the first face of the cover panel may be formed to be smooth and as a result aesthetically pleasing. The construction of the panel of the present disclosure is such that the first face of the cover panel will not show the shapes or shadows of the shapes of the other elements of the panel.

In an embodiment of the above embodiment, the first face of the cover panel supports decorative trim. The decorative trim may be selected to match the décor of the rest of the cabin. The decorative trim may include graphics, logos and or text as desired.

In an embodiment of any of the above embodiments, the décor panel comprises two or more housing apertures, the panel comprises at least the same number of insulation panels as housing apertures, and each housing aperture is configured to receive at least one of the insulation panels.

In an embodiment of any of the above embodiments at least one of the first and second faces of at least one of the décor panel, at least one insulation panel, the cover panel, and the structural panel is flat or approximately flat.

In an embodiment of any of the above embodiments both of the first and second faces of each of the décor panel, all of the insulation panels, the cover panel, and the structural panel is flat or approximately flat.

According to a second aspect of the present disclosure there is provided a galley for an aircraft, in which at least part of at least one wall defining the galley comprises at least one panel according to the first aspect of the present disclosure.

According to a third aspect of the present disclosure there is provided a galley for an aircraft, in which at least part of at least one compartment within the galley comprises at least one panel according to the first aspect of the present disclosure.

According to a fourth aspect of the present disclosure there is provided an aircraft, the aircraft comprising at least one galley according to the second aspect of the present disclosure and/or at least one compartment according to the third aspect of the present disclosure.

The panel, galley, compartment and aircraft of the first to fourth aspects of the present disclosure can include one or more, or all, of the embodiments described above, as appropriate.

6

BRIEF DESCRIPTION OF THE DRAWINGS

The present disclosure will be further described and explained by way of example with reference to the accompanying drawings in which.

DETAILED DESCRIPTION

Figures 1, 2:
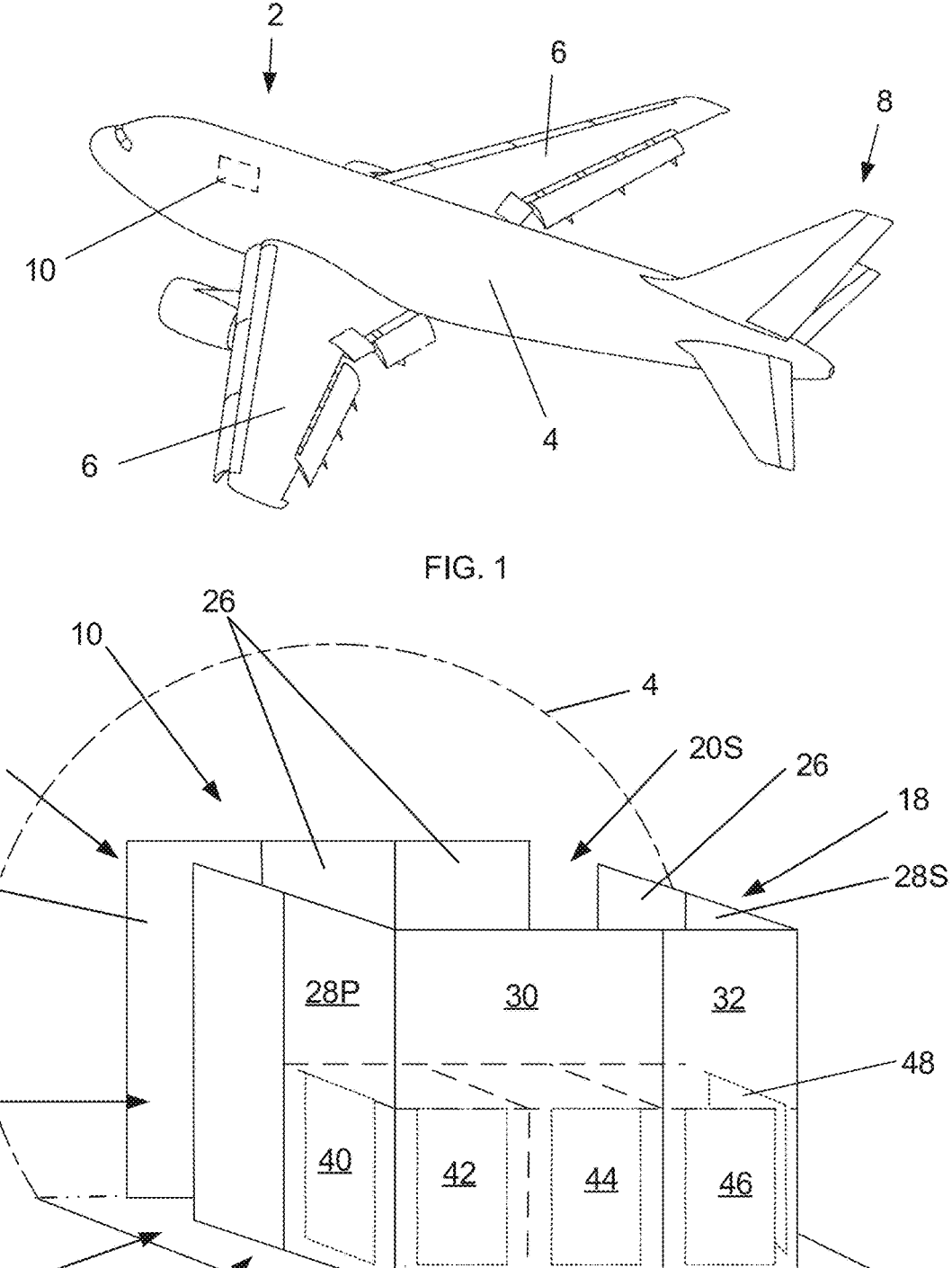
FIG. 1 shows a schematic embodiment of an aircraft according to the present disclosure.
FIG. 2 shows a schematic perspective view of an embodiment of a galley according to the present disclosure.
Figure 4:
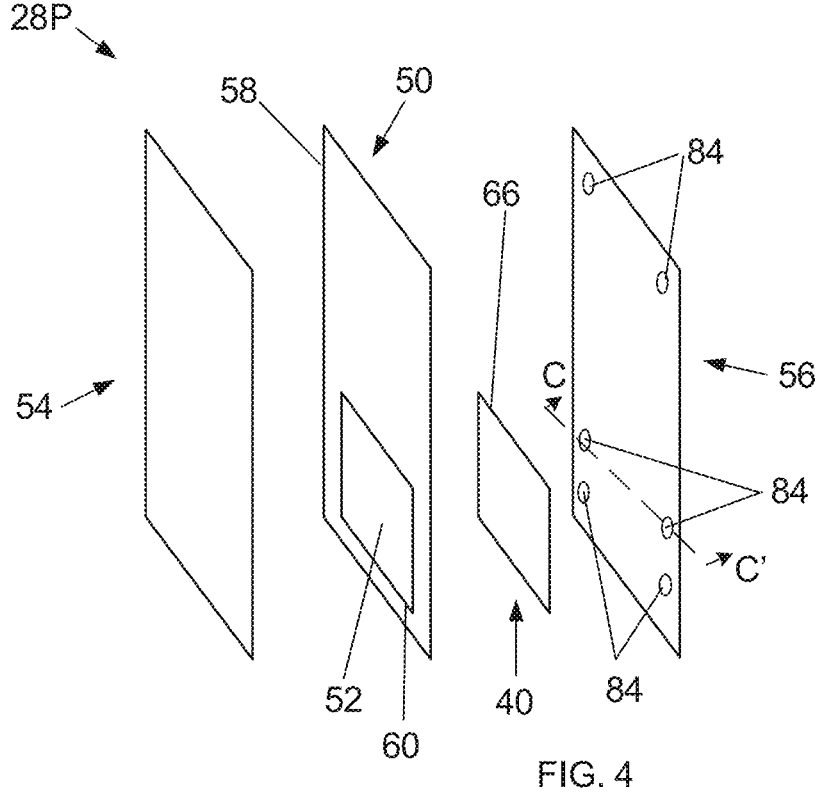
FIG. 4 shows a schematic exploded view of the panel of FIG. 3.
Figure 3:
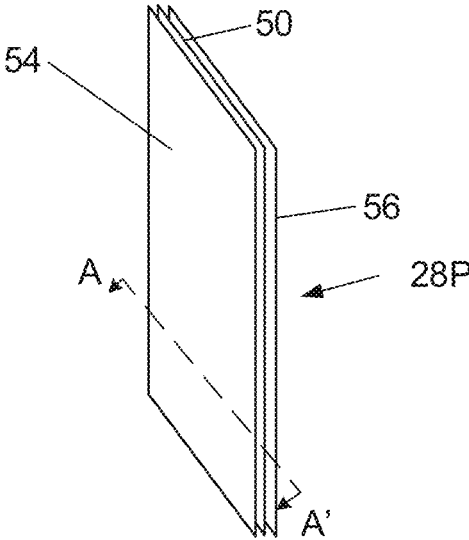
FIG. 3 shows a schematic perspective view of an embodiment of a panel according to the present disclosure.
Figure 5:
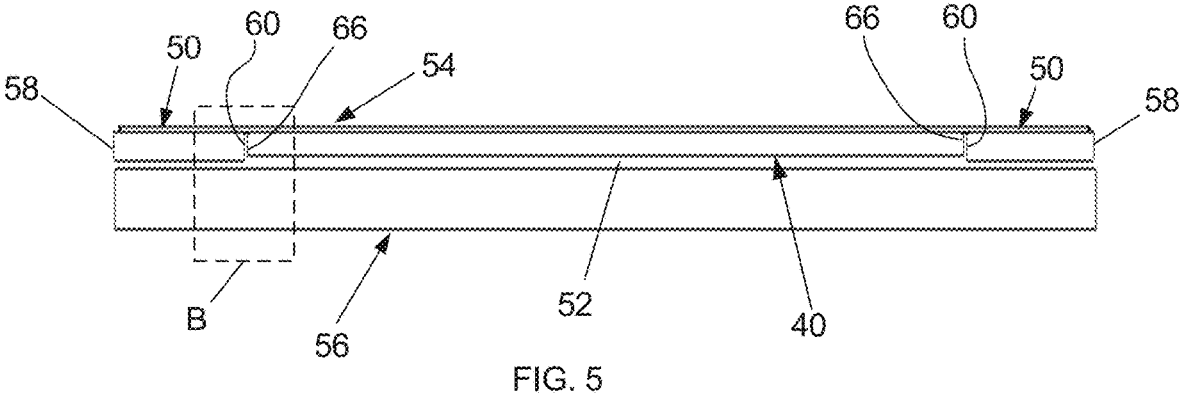
FIG. 5 shows a schematic sectional view of a first embodiment of the panel of FIG. 3 along section line A-A'.
Figure 6:
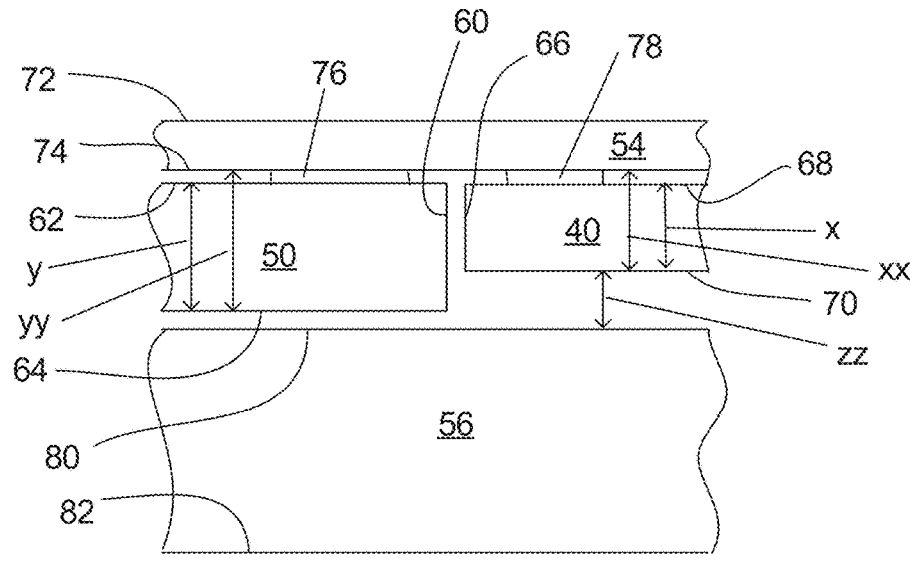
FIG. 6 shows an enlargement of portion B of FIG. 5.

With reference to FIG. 1, an aircraft 2 includes a body 4, a pair of wings 6, and a tail 8. Located within the body 4 is a galley 10 for the storage and preparation of food and beverages.

With reference to FIG. 2, the galley 10 is formed from a fore/forward wall 12, an aft/rear wall 14, a port/left wall 16 and a starboard/right wall 18. Entrance and exit from the galley 10 is via port and starboard openings 20P, 20S out of/into the port and starboard passages 22P, 22S respectively. The fore, aft, port and starboard walls 12, 14, 16, 18 are supported on a deck 24.

The fore wall 12 is formed from three panels 26 that do not fall within the scope of the present disclosure.

Each of the port and starboard walls 16, 18 are formed from a panel 26 (which does not fall within the scope of the present disclosure), and a panel 28P, 28S respectively (which do fall within the scope of the present disclosure).

The aft wall 14 is formed from a panel 30 and a panel 32 (both of panels 30 and 32 fall within the scope of the present disclosure).

Within the galley 10 there are three cooled or refrigerated cart compartments 34, 36, 38. Those compartments are cooled by a suitable cooling system (not shown).

To increase the efficiency of the cooling of compartment 34, panels 28P and 30 include insulation panels 40, 42 respectively. In the illustrated embodiment the insulation panels 40, 42 have the form of vacuum insulation panels (VIPs).

To increase the efficiency of the cooling of compartment 36, panel 30 includes insulation panel 44. Again, in the illustrated embodiment the insulation panel 44 has the form of a vacuum insulation panel (VIP).

To increase the efficiency of the cooling of compartment 38, panels 32 and 28S include insulation panels 46, 48 respectively. Again, in the illustrated embodiment the insulation panels 46, 48 have the form of a vacuum insulation panel (VIP).

With regard to FIGS. 2 to 6, panel 28P is formed from a décor panel 50, a cover panel 54, the insulation panel 40 and a structural panel 56.

The décor panel 50 has an outer perimeter 58 and an inner edge 60. Inner edge 60 defines a housing aperture 52. The housing aperture 52 is so located in the décor panel 50 that when the panel 28P is in place partially forming the galley 10 the housing aperture 52 is in a position relative to the compartment 34 which is to be insulated. The décor panel 50 has a first face 62 and a second face 64.

The insulation panel 40 has an outer perimeter 66, and first and second faces 68, 70. The configuration or shape and dimensions of the inner edge 60 of the décor panel 50 and the outer perimeter 66 are such that the insulation panel 40 is located within the housing aperture 52 with the inner edge 60 of the décor panel 50 and the outer perimeter 66 closely adjacent to each other.

The first and second opposing faces 68, 70 of the insulation panel 40 are spaced from each other by a distance x, and the first and second opposing faces 62, 64 of the décor panel 50 are spaced from each other by a distance y. The distances x and y extend in approximately parallel directions, and distance x is less than distance y. In some other non-illustrated embodiments the distance x is equal to distance y.

The cover panel 54 has first and second opposed faces 72, 74, and the second face 74 of the cover panel 54 is adjacent to or overlies the first face 62 of the décor panel 50.

The cover panel 54 is formed from a glass re-enforced polymer.

The cover panel 54 is permanently or temporarily fixed to the décor panel 50 by one or more fixing elements 76.

The first face 68 of the insulation panel 40 is fixed to the second face 74 of the cover panel 54 by at least one fixing element 78. In the illustrated embodiment the fixing element 78 is one of a releasable adhesive, a double-sided adhesive tape, and a burr fastener, or a mixture thereof.

When the cover panel 54 is permanently fixed to the décor panel 50 the one or more fixing elements 76 are a suitable known adhesive.

When the cover panel 54 is temporarily or releasably fixed to the décor panel 50 using at least one of the one or more fixing elements 76 is a releasable adhesive, a double-sided adhesive tape, or a burr fastener.

The structural panel 56 has a first and a second face 80, 82. The first face 80 of the structural panel 56 and the second face 64 of the décor panel 54 are releasably fixed to each other by a non-zero number, typically a plurality, of mechanical fixing means 84 (described further below with reference to FIGS. 7 and 8).

When the insulation panel 40 is fixed to the cover panel 54 the distance xx (from the second face 74 of the cover panel 54 to the second face 70 of the insulation panel 40) is less than the distance yy (the distance of the second face 74 of the cover panel 54 to the second face 64 of the décor panel 50). This has the effect that there is a space zz between the second face 70 of the insulation panel 40 and the first face 80 of the structural panel 56. This serves to protect the insulation panel 40 from damage resulting from rubbing or compression caused by relative movement of the cover panel 54 and the structural panel 56.

Figure 7:
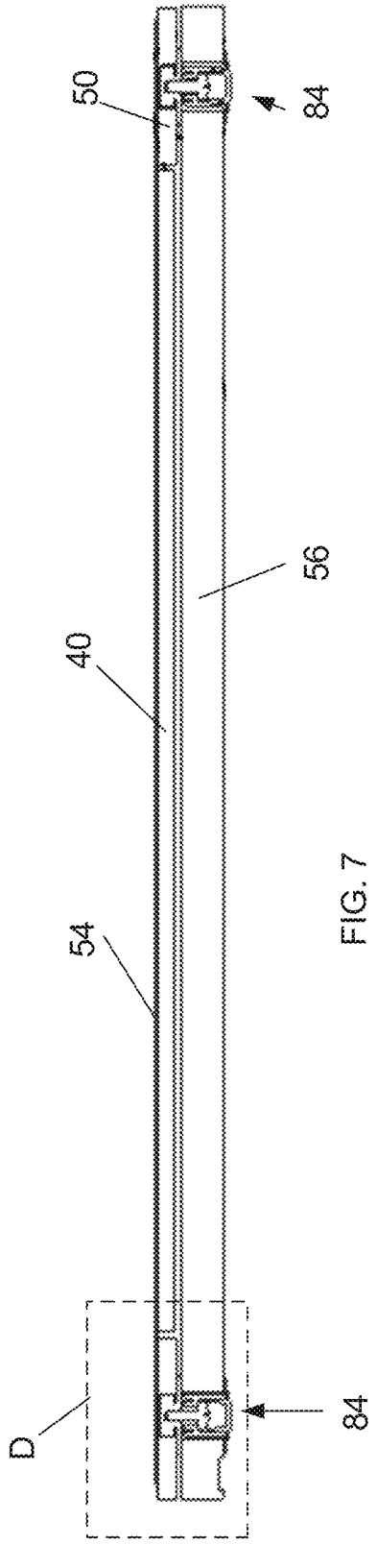
FIG. 7 shows a schematic sectional view of the panel of FIG. 4 along section line C-C'.
Figure 8:
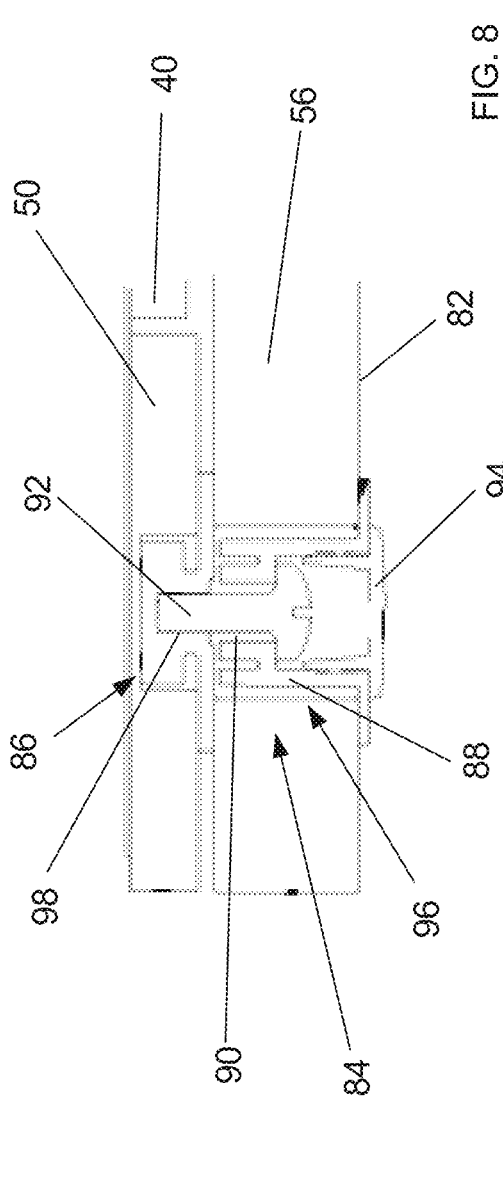
FIG. 8 shows an enlargement of portion D of FIG. 7.

With reference to FIGS. 7 and 8, the mechanical fixing means 84 includes a female portion 86 and a male portion 96. The female portion 86 is fixed into the décor panel 50 by fixing means (not shown). In some embodiments the fixing means is a suitable permanent adhesive. The female portion 86 includes a female threaded portion 98 which mouths through the second surface 74 of the décor panel 50.

The male portion 96 of the mechanical fixing means 84 is mounted in the structural panel 56. The male portion includes a bush 88 which is so configured that it includes an aperture 90 through which a threaded machine screw 92 extends. The threaded machine screw 92 is configured to threadingly engage with the insert 86. A dust cap 94 seals the portion of the bush 88 that opens in the second face 82 of the structural panel 56. As may be seen, when the dust cap 94 is not in the position shown in FIG. 8 a user can cause the threaded machine screw 92 to engage or disengage with the insert 86 from the second face 82 of the structural element 56.

In other non-illustrated embodiments other mechanical fixing means may be used.

The second face 72 of the cover panel 54 is, when the panel 28P is part of the galley 10, facing away from the galley 10 and, if there are passengers or other users of the aircraft 2 within the body 4, towards those passengers. The face 72 is suitable for decoration or supporting trim.

An advantage of the construction of the panel 28P as above described is that it the cover panel 54, décor panel 50, and structural panel 56 combine to protect the relatively more expensive and fragile insulation panel 40.

A further advantage is that the insulation panel 40 is typically heaver per unit surface area (in the plane of the first and second faces 68, 70 of the insulation panel 40) than the décor panel 50 and/or the structural panel 56 (in the same plane) the overall weight of the panel may be minimized by positioning the insulation panel 40 only in the locations such insulation is required.

A further advantage is that if the insulation panel 40 needs to be replaced and/or serviced, the panel 28P may be removed from forming part of the galley and the structural panel 56 easily removed from the décor panel 50 by disconnecting the mechanical fixing means 84. The insulation panel 40 may then be accessed and detached from the cover panel 54.

Panels 32 and 28S are configured and constructed in a similar fashion to panel 28P.

Panel 30 is configured and constructed in a similar fashion to panel 28P with the exception of there being two housing apertures 52 in décor panel 50, and insulation panel 42 in one of the housing apertures 52 and insulation panel 44 in the other of the housing apertures 52.

Figure 9:
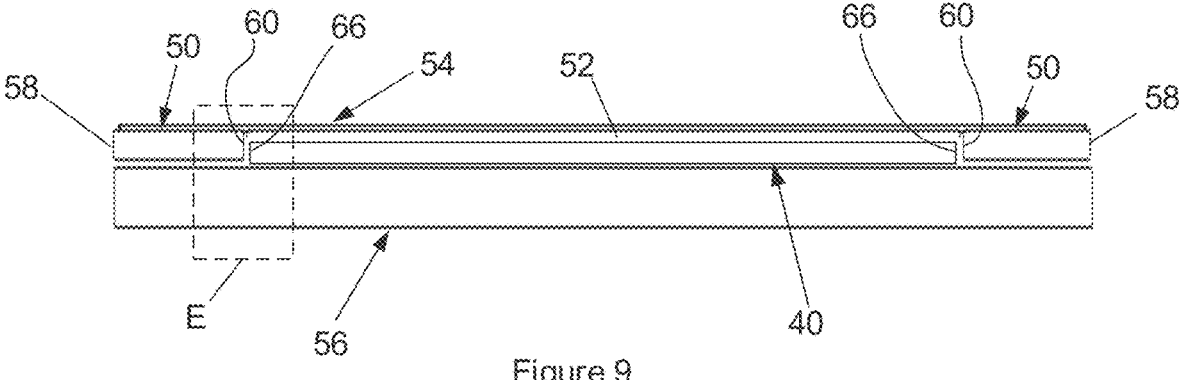
FIG. 9 shows a schematic sectional view of a second embodiment of the panel of FIG. 3 along section line A-A'.
Figure 10:
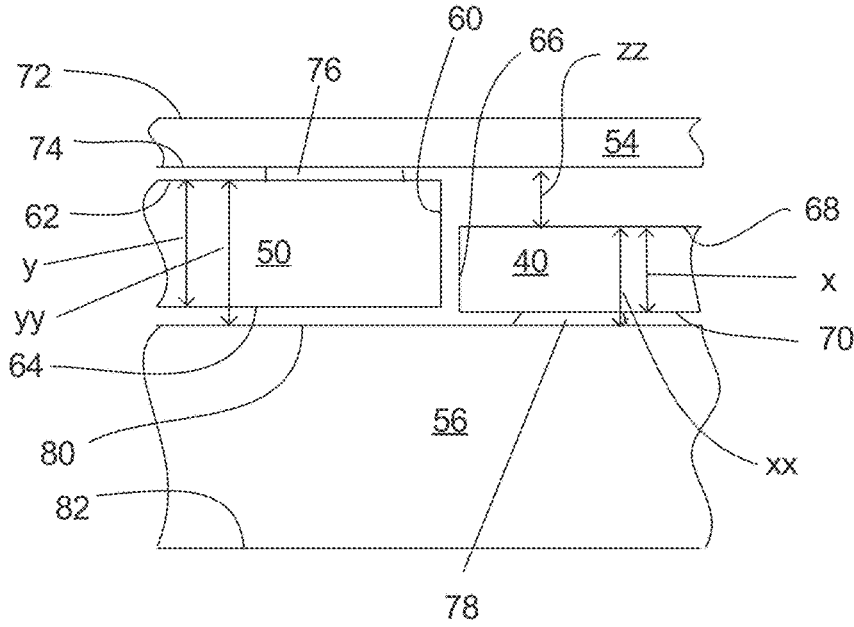
FIG. 10 shows an enlargement of portion E of FIG. 9.

With reference to FIGS. 9 and 10, a second embodiment of the panel 28P of the present disclosure is the same as the first embodiment discussed above with reference to FIGS. 1 to 8 with the exception that the second face 70 of the insulation panel 40 is fixed to the first face 80 of the structural panel 56 by fixing means 78.

In this embodiment the distance xx (from the first face 78 of the structural panel 56 to the first face 68 of the insulation panel 40) is less than the distance yy (the distance of the first face 80 of the structural panel 56 to the first face 62 of the décor panel 50). This has the effect that there is a space zz between the first face 68 of the insulation panel 40 and the second face 74 of the cover panel 54. This serves to protect the insulation panel 40 from damage resulting from rubbing or compression caused by relative movement of the cover panel 54 and the structural panel 56.

The above description is meant to be exemplary only, and one skilled in the art will recognize that changes may be made to the embodiments described without departing from the scope of the disclosure. Still other modifications which fall within the scope of the present disclosure will be apparent to those skilled in the art, in light of a review of this disclosure.

Various aspects of the method and apparatus disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A panel for use in the construction of a galley of an aircraft wherein the panel comprises a décor panel and at least one insulation panel, wherein the décor panel has first and second opposing faces, a housing aperture extends through the décor panel between the first and second faces, the housing aperture is of substantially the same configuration as the insulation panel or the insulation panels collectively when arranged side by side or when stacked, the housing aperture is configured to receive the at least one insulation panel, and the or each insulation panel is located in the housing aperture, wherein the panel comprises a cover panel, the cover panel has first and second opposed faces, and the cover panel is fixed to the décor panel with the second face of the cover panel adjacent to the first face of the décor panel, and wherein at least one insulation panel is fixed to the cover panel with the first face of the at least one insulation panel adjacent to the second face of the cover panel.

2. The panel according to claim 1, wherein the or each insulation panel is a vacuum insulation panel.

3. The panel according to claim 1, wherein, when there is one insulation panel, the insulation panel has first and second opposing faces, the first and second opposing faces of the insulation panel are spaced from each other by a distance x, the first and second opposing faces of the décor panel are spaced from each other by a distance y, the distances x and y extend in approximately parallel directions, and distance x is less than distance y or distance x is equal to distance y.

4. The panel according to claim 1, wherein the cover panel is at least one of permanently fixed or temporarily fixed to the décor panel.

5. The panel according to claim 4, wherein when the cover panel is temporarily fixed to the décor panel by at least one fixing means, and at least one fixing means is a releasable adhesive, a double-sided adhesive tape, or a burr fastener.

6. The panel according to claim 1, wherein the panel comprises a cover panel formed from a glass reinforced polymer.

7. The panel according to claim 1, wherein the panel comprises a structural panel having a first and a second face, wherein the structural panel is releasably fixed to the décor panel with the second face of the décor panel adjacent to the first face of the structural panel.

8. The panel according to claim 7, wherein the décor panel is releasably fixed to the structural panel using at least one mechanical fixing means.

9. The panel according to claim 8, wherein the or each mechanical fixing means is configured to be operable from the second face of the structural panel.

10. The panel according to claim 1, wherein at least one insulation panel is fixed to the structural panel with the second face of the at least one insulation panel adjacent to the first face of the structural panel.

11. The panel according to claim 1, wherein at least one insulation panel is fixed to the cover panel or structural panel by at least one fixing means, and at least one fixing means is a releasable adhesive, a double-sided adhesive tape, or a burr fastener.

12. The panel according to claim 1, wherein when the or each insulation panel is fixed to the cover panel the distance from the second face of the cover panel to the second face of the or each insulation panel is less than the distance of the second face of the cover panel to the second face of the décor panel, and when the or each insulation panel is fixed to the structural panel the distance from the first face of the structural panel to the first face of the or each insulation panel is less than the distance of the first face of the structural panel to the first face of the décor panel.

13. The panel according to claim 1, wherein the décor panel comprises two or more housing apertures, the panel comprises at least the same number of insulation panels as housing apertures, and each housing aperture is configured to receive at least one of the insulation panels.

14. A panel for use in the construction of a galley of an aircraft wherein the panel comprises a décor panel and at least one insulation panel, wherein the décor panel has first and second opposing faces, a housing aperture extends through the décor panel between the first and second faces, the housing aperture is of substantially the same configuration as the insulation panel or the insulation panels collectively when arranged side by side or when stacked, the housing aperture is configured to receive the at least one insulation panel, and the or each insulation panel is located in the housing aperture, wherein the panel comprises a structural panel, the structural panel has a first and second face, and the structural panel is releasably fixed to the décor panel with the second face of the décor panel adjacent to the first face of the structural panel, and wherein at least one insulation panel is fixed to the structural panel with the second face of the at least one insulation panel adjacent to the first face of the structural panel.

15. The panel according to claim 14, wherein the or each insulation panel is a vacuum insulation panel.

16. The panel according to claim 14, wherein, when there is one insulation panel, the insulation panel has first and second opposing faces, the first and second opposing faces of the insulation panel are spaced from each other by a distance x, the first and second opposing faces of the décor panel are spaced from each other by a distance y, the distances x and y extend in approximately parallel directions, and distance x is less than distance y or distance x is equal to distance y.

17. The panel according to claim 14, wherein the panel comprises a cover panel, the cover panel has first and second opposed faces, and the cover panel is fixed to the décor panel with the second face of the cover panel adjacent to the first face of the décor panel.

18. The panel according to claim 17, wherein the cover panel is at least one of permanently or temporarily fixed to the décor panel fixed.

19. The panel according to claim 18, wherein when the cover panel is temporarily fixed to the décor panel by at least one fixing means, and at least one fixing means is a releasable adhesive, a double-sided adhesive tape, or a burr fastener.

US 12,637,200 B2

11

12

20. The panel according to claim 14, wherein the décor panel is releasably fixed to the structural panel using at least one mechanical fixing means.

* * * * *